Sept. 4, 1956  E. A. TERRELL ET AL  2,761,194
BOBBIN STRIPPER
Filed June 22, 1954  10 Sheets-Sheet 1

INVENTORS
EDGAR A. TERRELL &
BY GETTYS D. HOYLE, JR.

Parrott & Richards
ATTORNEYS

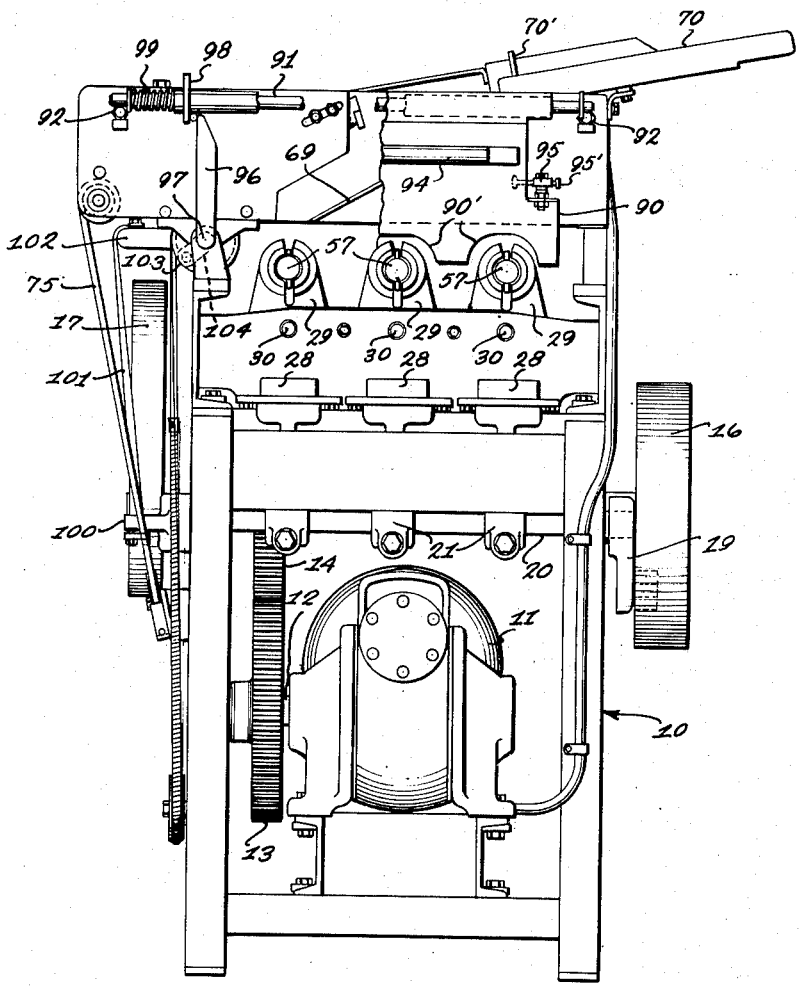

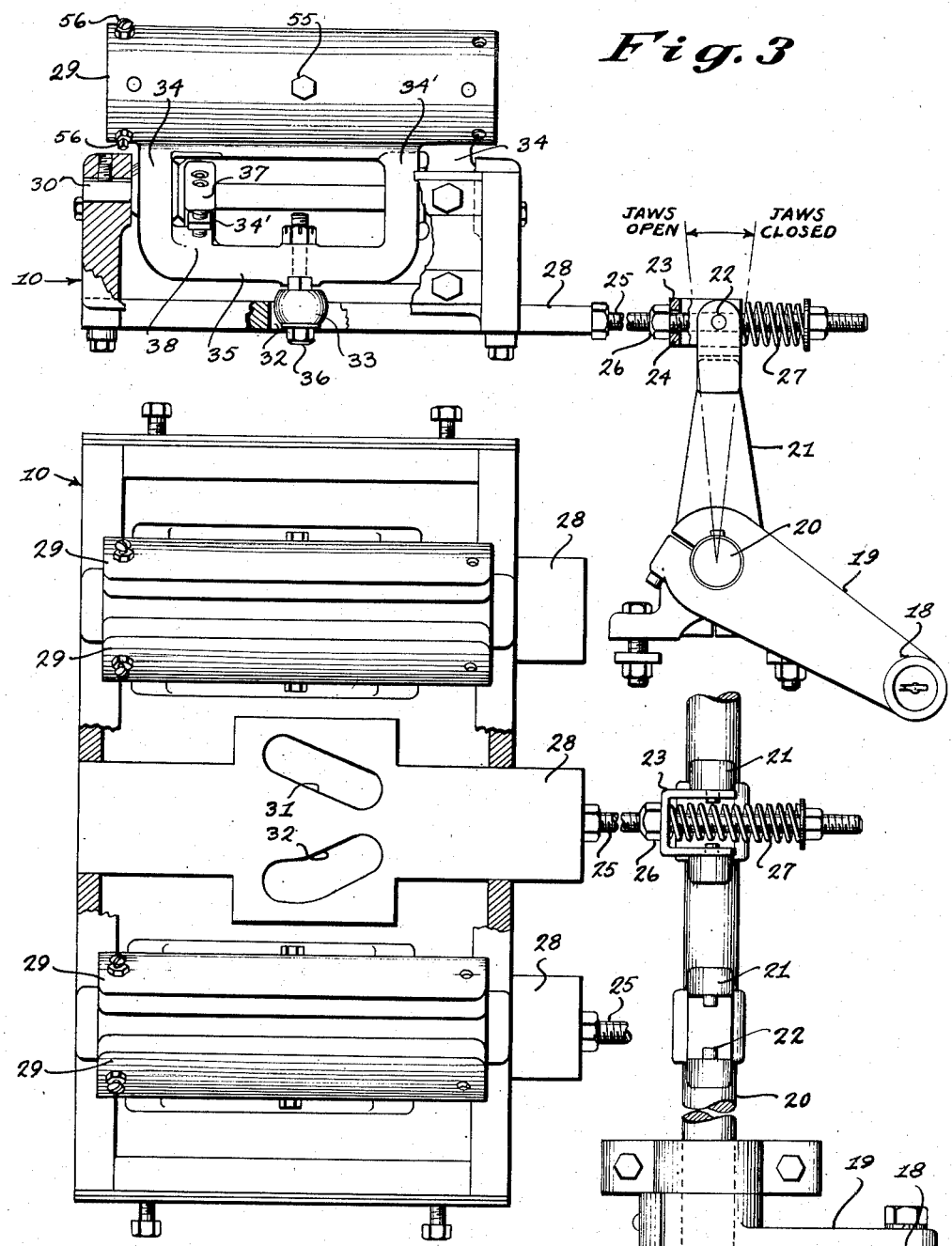

Sept. 4, 1956
E. A. TERRELL ET AL
2,761,194
BOBBIN STRIPPER
Filed June 22, 1954
10 Sheets-Sheet 5
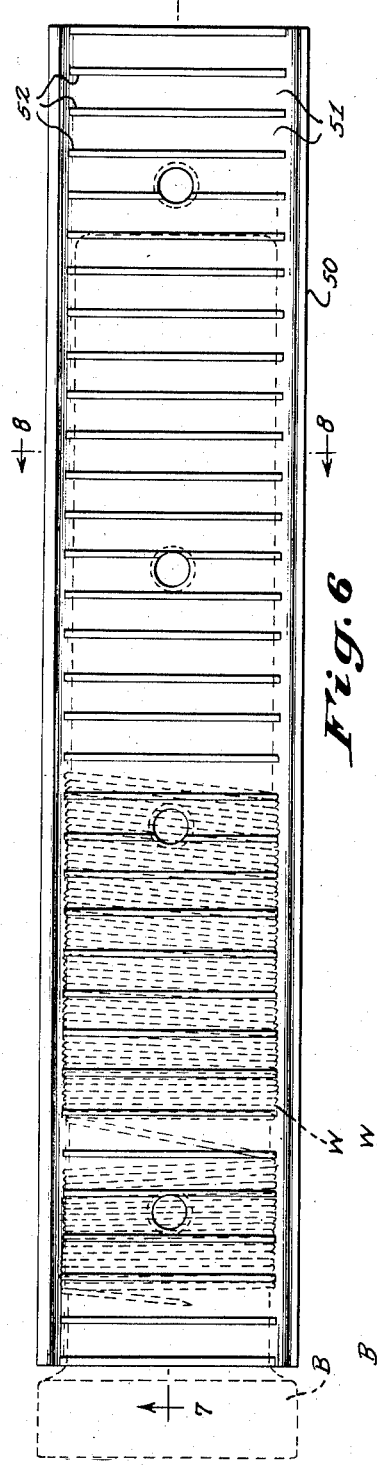
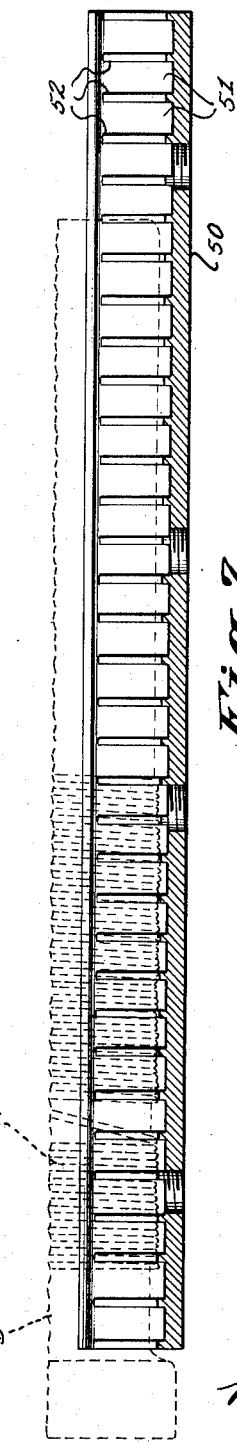
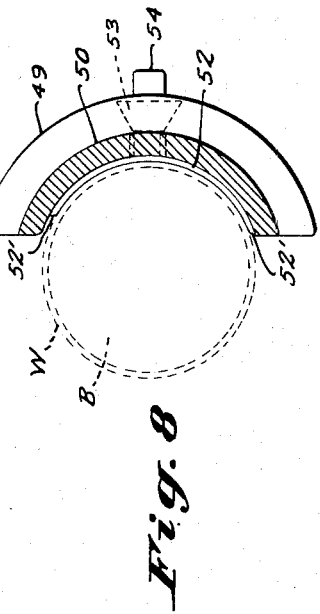
INVENTORS
EDGAR A. TERRELL &
BY GETTYS D. HOYLE, JR.
*Parrott & Richards*
ATTORNEYS Sept. 4, 1956 E. A. TERRELL ET AL 2,761,194
BOBBIN STRIPPER
Filed June 22, 1954 10 Sheets-Sheet 6

INVENTORS
EDGAR A. TERRELL &
GETTYS D. HOYLE, JR.
BY Parrott & Richards
ATTORNEYS Sept. 4, 1956

E. A. TERRELL ET AL 2,761,194

BOBBIN STRIPPER

Filed June 22, 1954

INVENTORS
EDGAR A. TERRELL &
GETTYS D. HOYLE, JR.
BY

*Parrott & Richards*
ATTORNEYS

Sept. 4, 1956 E. A. TERRELL ET AL 2,761,194
BOBBIN STRIPPER
Filed June 22, 1954 10 Sheets-Sheet 8

INVENTORS
EDGAR A. TERRELL &
BY GETTYS D. HOYLE, JR.

Parrott & Richards
ATTORNEYS

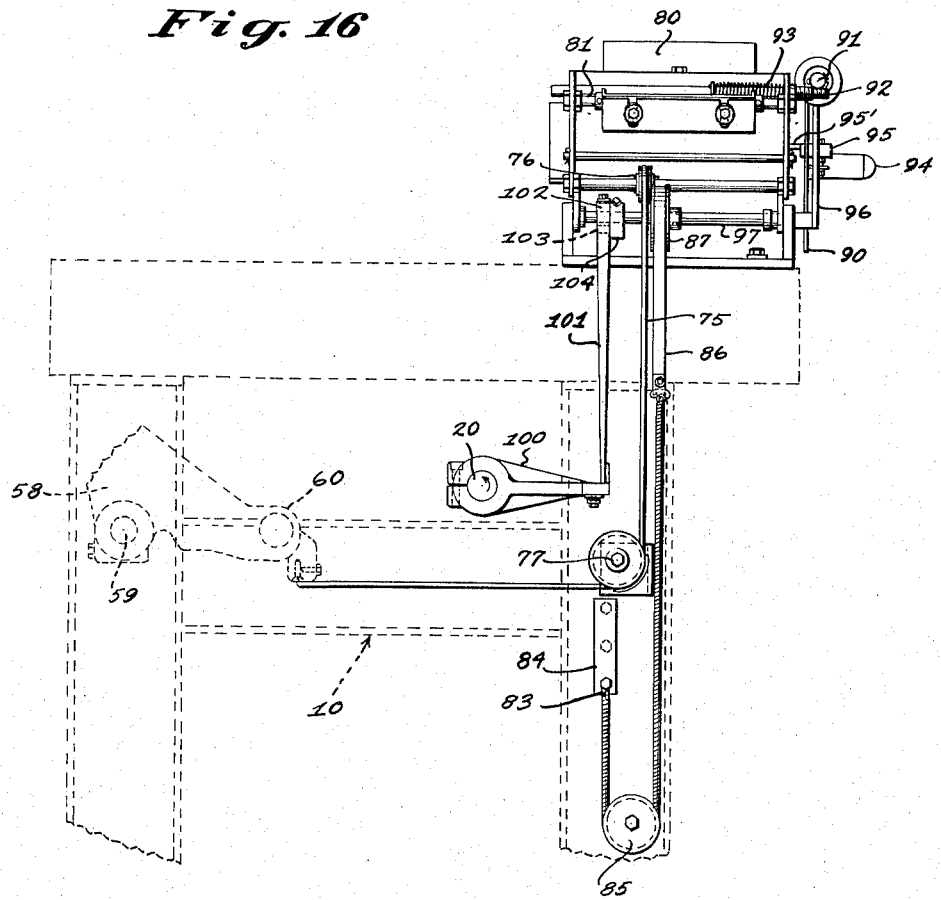

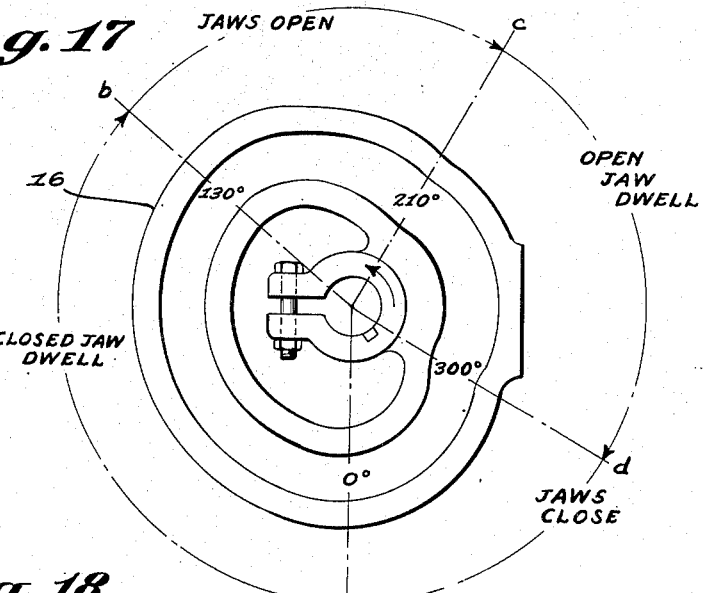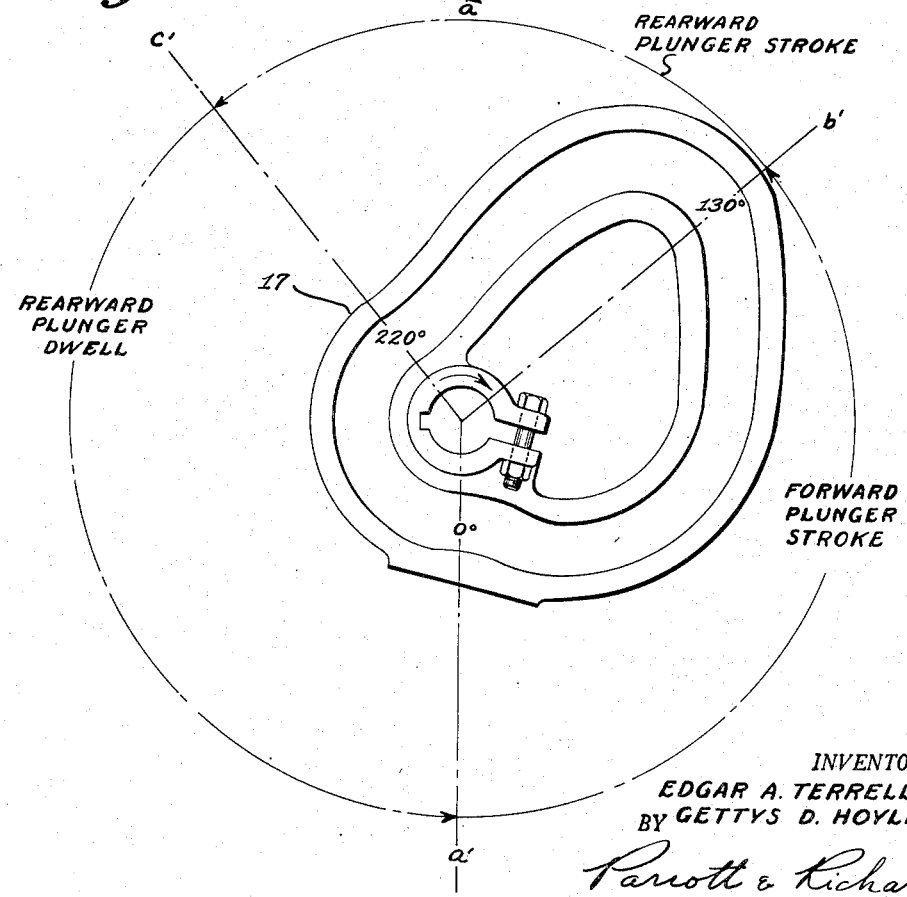

United States Patent Office 2,761,194
Patented Sept. 4, 1956

2,761,194
BOBBIN STRIPPER

Edgar A. Terrell and Gettys D. Hoyle, Jr., Charlotte, N. C., assignors to The Terrell Machine Company, a corporation of North Carolina Application June 22, 1954, Serial No. 438,542

12 Claims. (Cl. 28—20)

This invention relates to bobbin strippers or cleaners for removing waste yarn windings from spent textile bobbins, and in particular to an improved arrangement of stripping jaws for bobbin cleaning equipment of this sort and to the manner of feeding spent bobbins to this stripping jaw arrangement for cleaning.

In copending application Serial No. 257,858, filed November 23, 1951, now Patent No. 2,732,609, a stripping mechanism is disclosed that operates to grip the waste yarn windings on a spent bobbin so as to hold the windings in their original disposition while the bobbin is pushed out of them, and thereby eliminate the normal tendency of the windings to bunch as they are stripped. For this purpose, the stripping mechanism disclosed in the above noted copending application incorporates stripping jaws of substantially bobbin barrel length that have the gripping faces thereof fitted with friction linings providing the jaws, when closed upon a spent bobbin, with a greater affinity for waste yarn windings on the barrel of the bobbin than these windings have for the barrel.

This stripping mechanism of the copending application identified above is particularly well adapted for use in cleaning card room bobbins, for example, in which the bobbin barrels are cylindrical in form, and it has been found to facilitate greatly the stripping of such bobbins. Under certain circumstances, however, it has also been found that closing of the friction lined stripping jaws on a spent bobbin to grip the waste yarn windings effectively has required such force that the power needed to push the bobbin out of the gripped windings has been more, and in some cases substantially more, than desirable.

According to the present invention an improved form for the stripping jaws is provided that allows spent bobbins to be pushed from waste yarn windings thereon at entirely satisfactory power requirements, while still affording a consistently effective grip on the windings as they are stripped. Briefly described, the improved stripping jaws of the present invention are characterized by gripping faces that are rigid and that have transverse grooves formed therein at spaced intervals over their entire length to leave relatively narrow, smooth faced, transverse ridges therein. We have found that gripping faces of this sort operate effectively to strip the waste yarn windings even though spaced in closed position from the bobbin barrel, and that their closed position accordingly can be limited to avoid imposing an unduly tight grip on the bobbin barrel and thereby substantially ease the removal of the bobbin from the gripped waste yarn windings.

The present invention is described in further detail below in connection with the accompanying drawings, in which:

Fig. 2 is a corresponding end elevation as seen from the left in Fig. 1;

Fig. 3 is an enlarged detail in side elevation illustrating the operating arrangement of the stripping jaws employed in the machine shown in Figs. 1 and 2;

Fig. 4 is a top plan detail corresponding generally to Fig. 3;

Fig. 6 is a plan view showing the inner gripping face of the stripping jaws as arranged according to the present invention, with the relation thereto of a representative spent bobbin to be stripped indicated by broken lines;

Fig. 7 is a section taken substantially on the line 7—7 in Fig. 6;

Fig. 8 is a section taken substantially on the line 8—8 in Fig. 6;

Fig. 16 is a fragmentary side elevation corresponding generally to Fig. 1, but taken from the opposite side of the machine shown therein, to illustrate the operating connections for the feed means;

Fig. 17 is a face view of the operating cam for the stripping jaws; and

Fig. 18 is a related face view of the operating cam for the displacement plungers.

Figure 1:
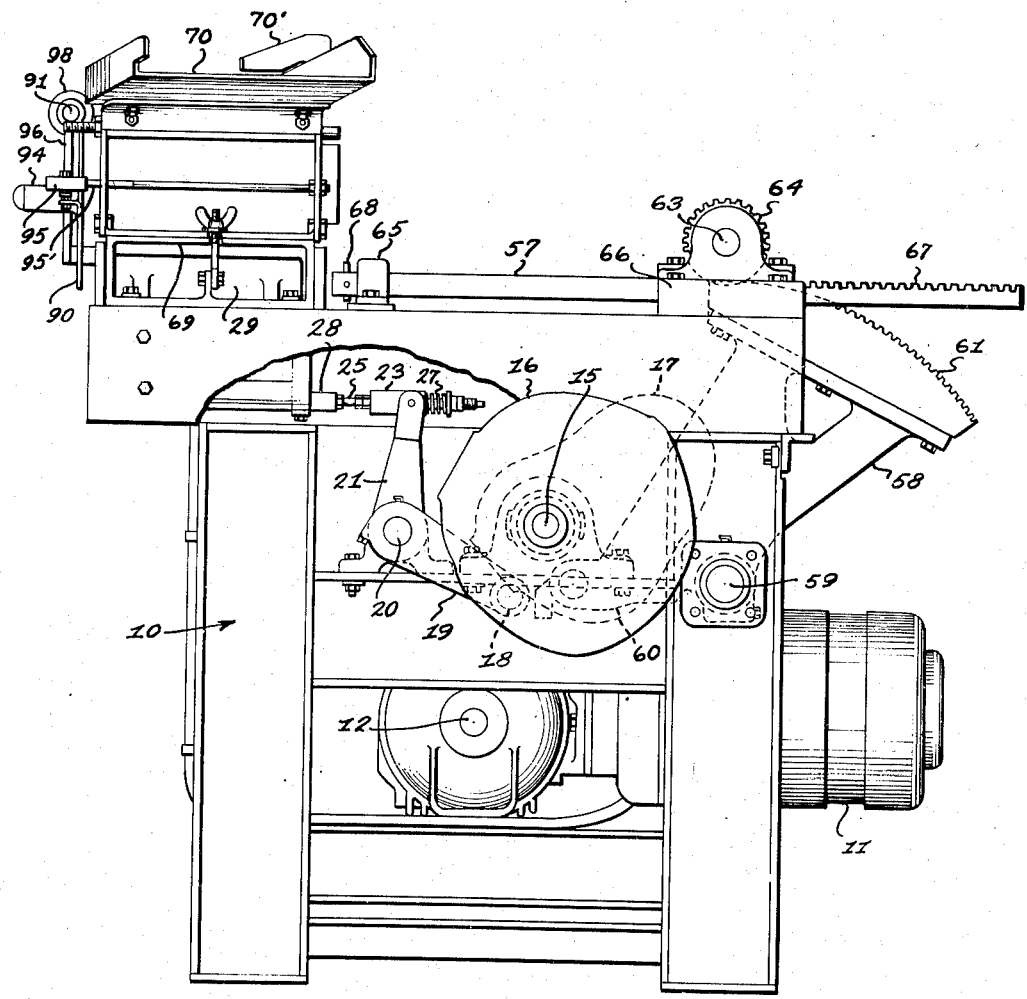
Fig. 1 is a side elevation, partly broken away, of a bobbin stripping machine embodying the present invention.
Figure 12:
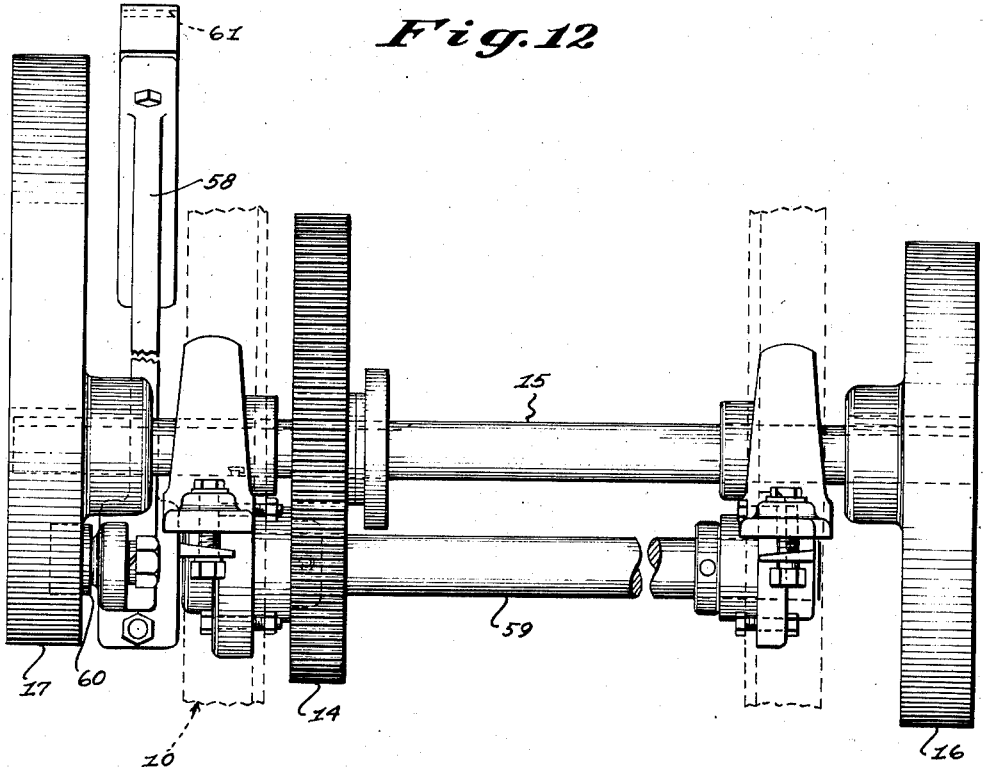
Fig. 12 is a detail of the drive connection for the displacement plungers from the operating cam shaft of the machine shown in Figs. 1 and 2.
Figure 11:
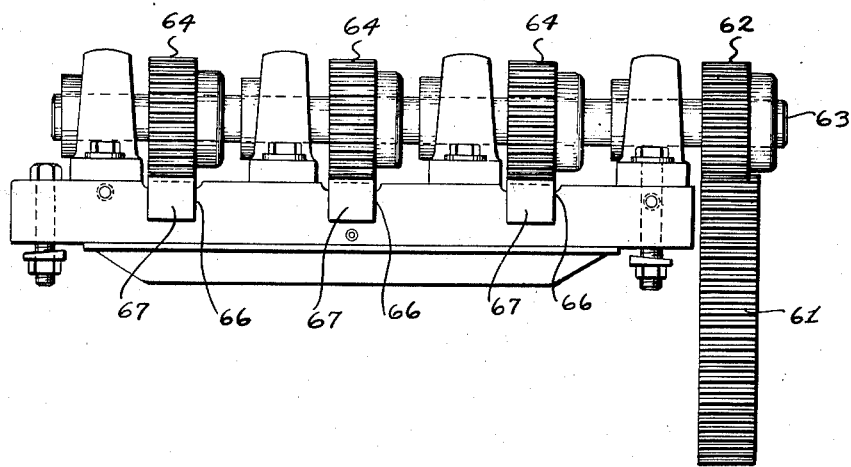
Fig. 11 is a rear end view corresponding to Fig. 9.

Referring now in detail to the drawings, and more particularly at first to Figs. 1 and 2, the embodiment of the present invention illustrated comprises a bobbin stripping machine in which a frame structure, as illustrated generally by the reference numeral 10, is suitably arranged to support a gear motor 11 with the power shaft 12 thereof connected through a gear pair 13, 14 to drive a cam shaft 15 having operating cams 16 and 17 arranged at opposite ends thereof (compare Fig. 12).

Figure 5:
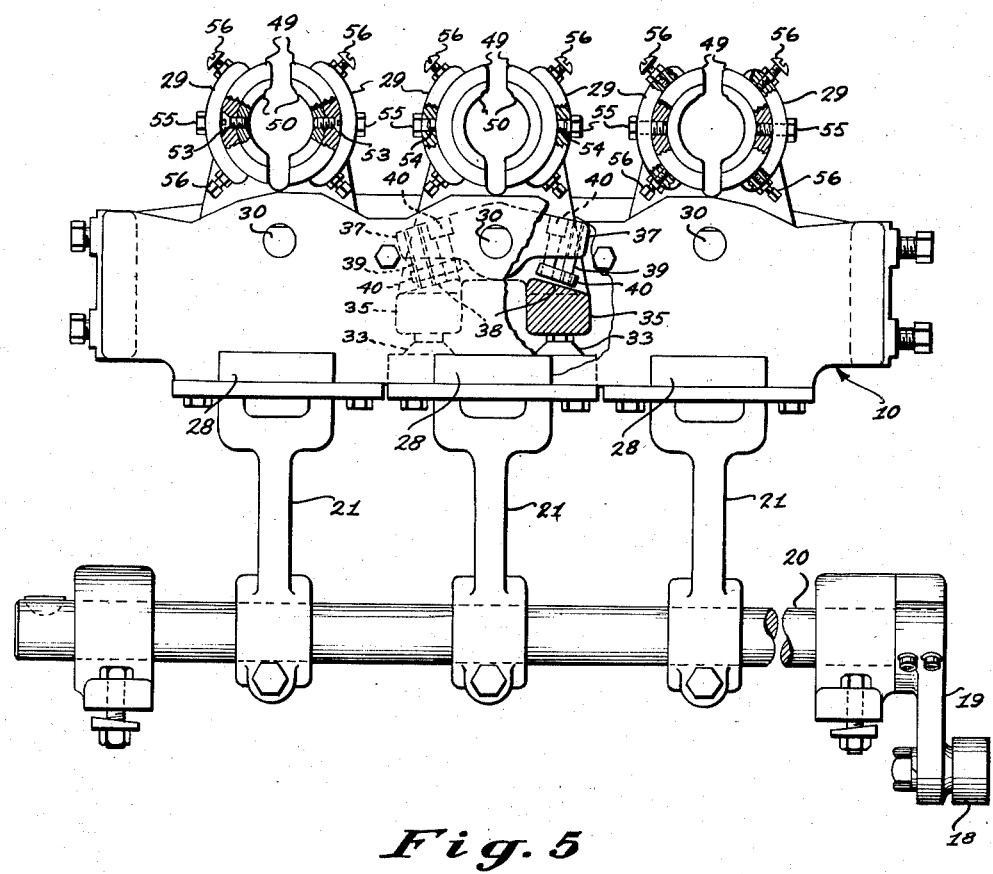
Fig. 5 is a generally corresponding detail in end elevation as seen from the left in Fig. 4.
Figure 9:
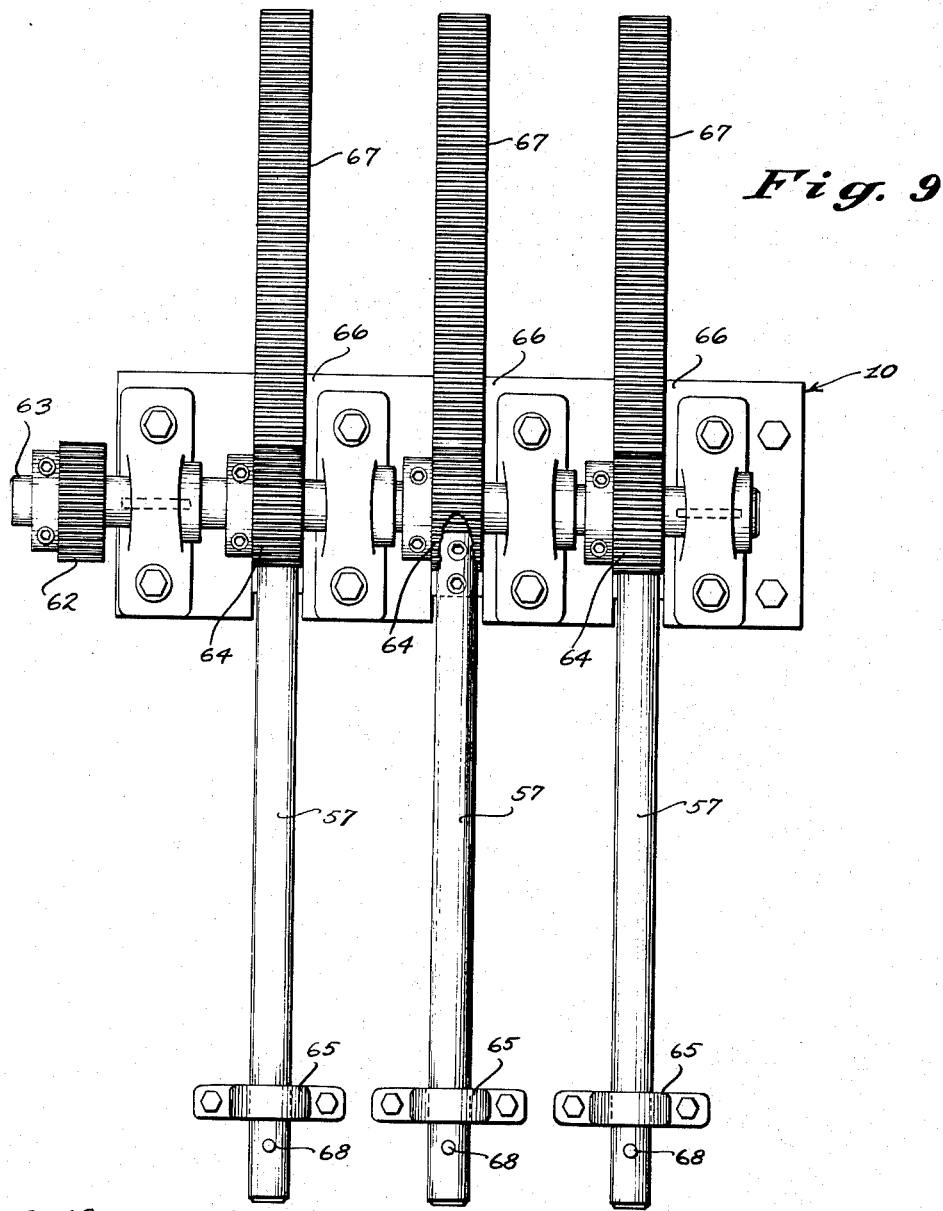
Fig. 9 is a plan detail showing the arrangement of displacement plungers for ejecting bobbins from the stripping jaws.
Figure 10:
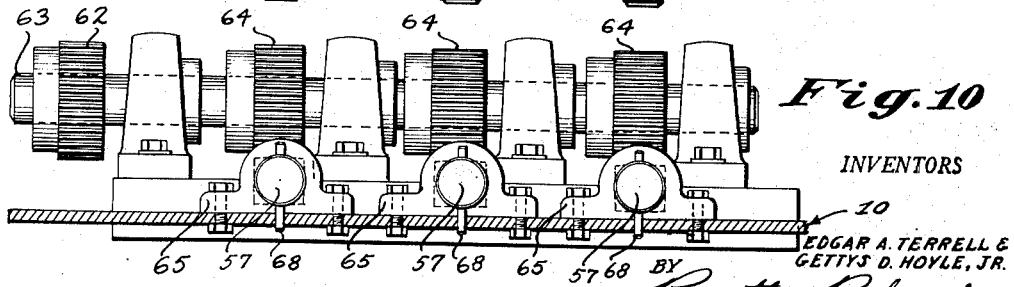
Fig. 10 is a front end view corresponding to Fig. 9.

Both of the operating cams 16 and 17 are face cams, and a follower 18 for the cam 16 is carried by a rock arm 19 extending from a rock shaft 20 that is journaled on the frame structure 10. This rock shaft 20 is also fitted with a series of actuating lever arms 21 (compare Figs. 3, 4 and 5) having yoke shaped extending ends at which opposed pivot pins 22 are arranged for connecting yoke brackets 23 therewith. The yoke brackets 23 have a clearance opening 24 through their base at which they are slidably disposed on stud shafts 25; the stud shafts 25 having positioning shoulders 26 fixed thereon for limiting relative sliding movement of the yoke brackets 23 in one direction, and having compression springs 27 confined thereon to bottom in the opposite direction against the yoke brackets 23. Accordingly, movement of the lever arms 21 by the rock shaft 20 is transmitted to the stud shafts 25 in one direction through the compression springs 27 from the yoke brackets 23, and in the other direction through abutment of the yoke brackets 23 at the fixed shoulders 26.

The stud shafts 25 extend from slide plates 28 that are arranged for effecting opening and closing movement of pivoted pairs of stripping jaws 29 arranged in a bank, a slide plate 28 being provided for each pair of jaws 29 in the bank. Each slide plate 28 is supported on the frame structure 10 for reciprocation along a central, horizontal, axis aligned with a respective rock shaft lever arm 21 and lying in the central plane in which the lever arm 21 is moved by the rock shaft 20; and the stud shaft 25 for each slide plate 28 is fixed thereon to extend in line with the central axis along which the slide plate 28 reciprocates.

The pairs of stripping jaws 29 are mounted above the slide plates 28 on pivot shafts 30, and the operating connection from the slide plates 28 to the stripping jaws 29 is arranged through angled cam slots 31 and 32 in the slide plates 28, and cam balls 33 carried by the stripping jaws 29 so that they are disposed in the slide plate cam slots 31 and 32, respectively, as followers. The stripping jaws 29 are adapted for carrying the cam balls 33 and for mounting in pairs on the pivot shafts 30 by an integral shank structure comprising pivot arm portions 34 and 34' spaced in depending relation from the jaws 29 proper and connected at their lower ends by a cross arm portion 35, the entire shank structure being offset toward one end of the stripping jaws 29 so that any one stripping jaw 29 can be paired with any other one simply by reversing it in opposed relation and internesting the pivot arm portion 34' of each stripping jaw 29 at the inside face of the pivot arm portion 34 of the other jaw 29 of the pair for aligned mounting on the common pivot shaft 30.

The cross arm portion 35 of this shank structure serves to carry the previously mentioned cam balls 33 on studs 36 that are transversely aligned midway of the stripping jaws 29 so that the cam balls 33 for each pair of jaws 29 are disposed in direct opposition. The internested pivot arm portion 34' of each stripping jaw 29 is further formed with a lateral projection 37 arranged to extend above the cross arm portion 35 of a paired stripping jaw 29 in relation to a boss 38 formed on each cross arm portion 35, and the extending end of each lateral projection 37 is fitted with a set screw 39 that may be fixed, by an associated locking plate 40 and clamping stud 41, at an adjusted position opposite the paired boss 38 as a stop pin by which the closed position of the stripping jaws 29 can be limited.

Closing movement of the stripping jaws 29 is effected by movement of the rock shaft 20 clockwise, as seen in Fig. 3, to pivot the lever arms 21 to the right and thereby cause the yoke brackets 23, acting through compression springs 27, to pull the stud shafts 25, and the slide plates 28 fixed thereto, likewise to the right. The slide plate cam slots 31 and 32 are angled so that they diverge to the left as seen in Fig. 3 (compare Fig. 4), and the result of pulling the slide plates 28 to the right is therefore to spread the cam balls 33 so as to pivot the stripping jaws 29 to closed position as determined by the limiting adjustment of set screws 39 in relation to the opposed bosses 38 (see Fig. 5). In this connection is should be noted that the closed position of the stripping jaws 29 may be limited in the above indicated manner because the compression springs 27 are interposed to absorb any overriding motion of the rock shaft 20 after the set screws 39 have bottomed on the bosses 38. It should also be noted that one of the cam slots 32 in each slide plate 28 turns intermediately of its length from an initially diverging axis to a path parallel with the axis on which the slide plates 28 reciprocate, so that when the stripping jaws 29 reach closed position the entire force from the compression springs 27 is exerted through the other cam slots 31 to double the effectiveness of the springs 27 in holding the jaws 29 at closed position during the stripping operation.

The stripping jaws 29 are adapted for effective bobbin stripping, according to the present invention, by fitting each stripping jaw 29 with an arcuate supporting shell 49 and jaw liner 50, the jaw liners 50 being formed to provide the gripping faces for the stripping jaws 29 as illustrated in Figs. 6, 7 and 8. Figs. 6, 7 and 8 show a jaw liner 50 in relation to a broken line representation of a typical card room or roving bobbin B, in which the barrel is of cylindrical form, and which is represented in proportion to a typical barrel diameter of 1⅝" and overall length of 9½".

Roving bobbins are commonly wound with a full traverse in building yarn packages thereon; that is, the yarn package is built up of yarn windings in layers that each extend for the full length of the package, and that in turn extend on the bobbin barrel for substantially its full length. After the wound yarn package has been withdrawn from the bobbin for use, the spent bobbin (such as B in Figs. 6, 7 and 8) is characteristically left with residual waste yarn windings W of the original yarn package remaining thereon that must be stripped from the bobbin barrel before the bobbin B can be reused. The residual waste yarn windings W are illustrated in Figs. 6, 7 and 8 with a disposition that exemplifies their condition on the spent bobbin B when ready for stripping, although it should be noted that this disposition is subject to considerable variation depending on such factors as the nature of the original yarn package from which the waste yarn windings W were left, the particular point at which delivery of the yarn end from the original package was finally interrupted to leave the waste yarn windings W on the spent bobbin B, and the extent to which the waste yarn windings W may have become somewhat disarranged in the course of handling the spent bobbins B prior to the stripping operation. These and other related factors may result in a layer of waste yarn windings W that extend on the bobbin B for substantially the entire length of the bobbin barrel (i. e., the full winding traverse) or that cover any lesser portion of the barrel length; that have the winding wraps closely or relatively widely spaced either in whole or in part; and that may consist of one or more layers, although usually not more than three.

However arranged, the waste yarn windings W are stripped according to the present invention by first gripping the entire extent of the windings W in the disposition they have on the bobbin B when ready for stripping, and then holding the gripped windings W so that they cannot bunch and bind while the bobbin B is pushed out of them. For this purpose, the jaw liners 50 are formed in a length that is at least substantially coextensive with the barrel of the bobbin B (i. e., at least coextensive with the extent of the winding traverse along the bobbin barrel), and with an arcuate profile proportioned for gripping the windings W and holding them effectively against bunching. As shown in Figs. 6, 7 and 8, the length of the jaw liners 50 may, as a practical matter, substantially exceed the length of any particular size of bobbin B in order to accommodate a full length range for bobbins of the same barrel diameter. The arcuate profile of the jaw liners 50 is shaped at a radius slightly exceeding the barrel radius of the bobbin B to be stripped, the liner profile radius being selected to approximate the mean radius of the waste yarn windings W on the bobbin barrel so that the jaw liners 50 may be closed effectively on the windings W while having the closed position thereof limited, in the manner described above, to prevent any gripping contact with the bobbin barrel and to avoid excessive gripping pressure on the windings W. As a practical matter, because a given group of bobbins in commercial use will normally vary in diameter to some extent, and because the closed position of the jaw liners 50 should be set in relation to the smallest variance in diameter to obtain consistent cleaning of all bobbins in the group, the jaw liners 50 may actually grip the barrels of some of the bobbins of larger diameter in a group of bobbins being stripped, but the grip of the jaw liners 50 in such a case will be relatively light, because it is applied through the compression springs 27, and the stripping action of the jaw liners 50 will not be appreciably affected.

As previously mentioned, the jaw liners 50 are made rigid, being formed of steel or other rigid, wear resistant, material, and in order to provide an effective stripping purchase on the windings W, while at the same time preventing disarrangement and bunching of the windings W, the gripping face of each jaw liner 50 is formed with relatively wide transverse grooves 51 spaced over the entire liner length to leave a series of narrow, smooth-faced, transverse ridges 52. It is important that these ridges 52 be smooth-faced or blunt in order to avoid damaging any bare barrel surface portions of the bobbins B as they are fed between the jaw liners 50 for stripping, and the ends of the ridges 52 are rounded as at 52' for the same purpose. It is also important that the ridges 52 be relatively narrow so that they will not grip any appreciable extent of the waste yarn windings W directly against the bobbin barrel and their gripping action will accordingly not vary substantially with variations in the number of layers composing the windings W to be stripped. The relative width of the intermediately spaced transverse grooves 51 must be great enough to allow a substantial selective gripping action by the ridges 52, but not so great as to allow freedom for bunching of the windings W between the ridges 52. The depth of the grooves 51 is not important so long as it is enough to form the ridges 52 distinctly for effective gripping action. In actual practice, jaw liners 50 having grooves 51 of ¼" width and ⅟₁₆" depth with ridges 52 of ⅟₁₆" width therebetween have been found to provide effective stripping action under a wide variety of conditions, and these dimensions represent the order in which the grooves 51 and ridges 52 should be formed. It should also be noted that other small, smooth-faced, raised portions might be used instead of the ridges 52. For example, the jaw liners 50 might be cross grooved to leave more or less diamond shaped raised portions, so long as these raised portions were maintained blunt to avoid damaging the bobbin barrels and the relative width of the grooves was enough to provide selective gripping action at the raised portions. The above described arrangement of transverse grooves 51 and ridges 52, however, is much more easily formed.

The supporting shells 49 are provided for mounting the jaw liners 50 in the stripping jaws 29 so that the liners 50 may be interchanged readily for stripping bobbins B of different barrel diameters. Each jaw liner 50 is arranged for attachment to its supporting shell 49, by machine screws 53 or the like to form a unit therewith for mounting on the stripping jaws 29. The supporting shell 49 is in turn formed with dowel lugs 54 adjacent each end for locating it properly on the stripping jaws 29 so that it may be held in place by a single stud screw 55 allowing easy installation and removal.

The stripping jaws 29 are further formed for fitting with set screws 56, adjacent the end thereof from which the bobbins B are ejected after stripping, to allow the supporting shells 49 and jaw liners 50 to be set with a taper when particularly adverse stripping conditions are encountered, as is true sometimes when synthetic fiber yarns are being stripped, or when more than normal variation is encountered in the number of layers of the windings W that must be stripped. The taper used in such instances does not change the manner in which the jaw liners 50 operate to strip waste yarn windings W, but simply serves to increase the purchase of the liners 50 on the windings W. As a typical example, with jaw liners 50 formed with a radius of ²⁷⁄₃₂" for stripping bobbins B having a barrel diameter of 1⅝", the liners 50 should be set in at their ejection ends no more than ⅟₃₂" in providing a taper to facilitate their stripping action.

It should also be noted that the jaw liners 50, together with their supporting shells 49, are formed less than semi-circular in profile so that in closed position a gap is left between their adjacent edges to provide for removing waste yarn windings W therefrom after stripping, as is explained further below.

The bobbins B are ejected from the closed stripping jaws 29 by means of reciprocating plungers 57 that are driven from the second previously mentioned operating cam 17 through a segment arm 58 as shown generally in Figs. 1 and 2 and illustrated more in detail in Figs. 9, 10, 11 and 12. The segment arm is pivoted on a shaft 59 and has a follower arm portion 60 reaching to the operating cam 16, while a gear face 61 thereon is arranged to engage a pinion 62 carried by a countershaft 63, which also carries pinions 64 for each of the plungers 57. The plungers 57 are each disposed in forward and rear slideways 65 and 66 and are fitted at their rear ends with racks 67 through which the pinions 64 act to reciprocate the plungers 57 axially through the closed stripping jaws 29 for a stripping operation during which the jaws 29 grip and hold waste yarn windings W to be stripped while the plungers 57 push bobbins B therefrom and eject the bobbins from the jaws 29. Each plunger 57 is fitted adjacent its forward end with a vertically projecting pin 68 arranged to move through the previously mentioned gaps left between the adjacent edges of the jaw liners 50, and their supporting shells 49, to pick up waste yarn windings W as they are stripped from bobbins B being ejected and in this way carry stripped windings W out of the jaws 29 at the end of each stripping operation, as disclosed in the above noted copending application.

Figure 13:
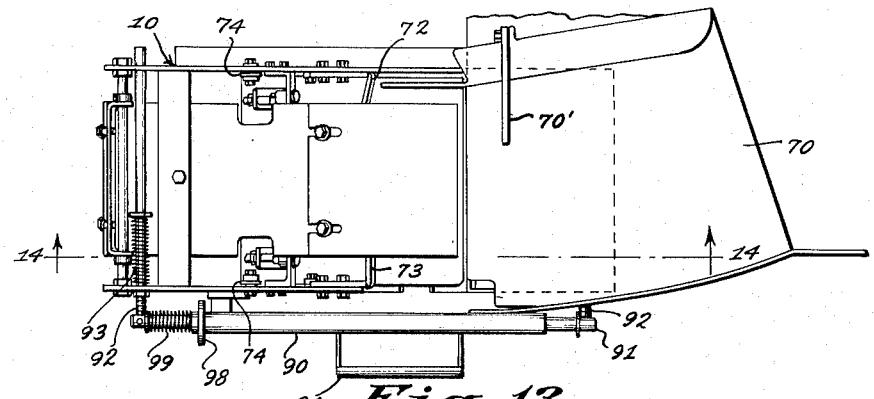
Fig. 13 is a plan detail of the feed means provided for delivering spent bobbins to the stripping jaws.
Figure 14:
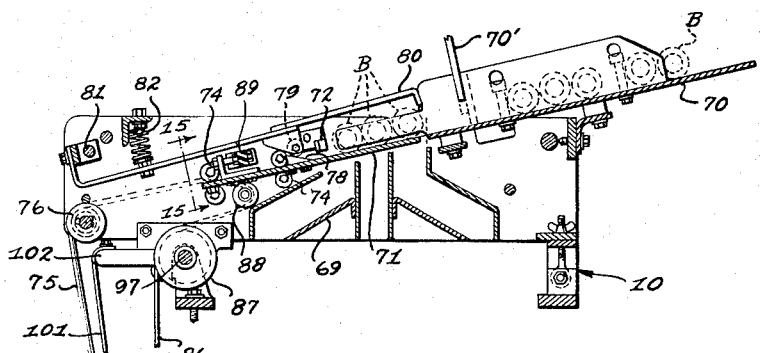
Fig. 14 is a vertical section detail taken substantially on the line 14—14 in Fig. 13.

The bobbins B to be stripped are fed to the open stripping jaws 29 through a multiple chute structure 69 from an inclined feed pan 70 on which a supply of the bobbins B to be stripped are arranged and directed onto a shutter plate 71 above the chute structure 69 (see Figs. 13 and 14). Fixed stops 72 and 73 are disposed to select and restrict the number of bobbins B that may be fed onto the shutter plate 71 in correspondence with the number of pairs of stripping jaws 29, and to locate the bobbins B fed onto the shutter plate 71 in vertical alignment with the multiple chute structure 69, and an adjustable clearance arm 70' is arranged at the rear side of the feed pan 70 to insure proper forward disposition of the large base end of all bobbins B fed, so that withdrawal of the shutter plate 71 from beneath the bobbins B thereon will result in dropping them into the chute structure 69 for transfer between pairs of stripping jaws 29.

Figure 15:
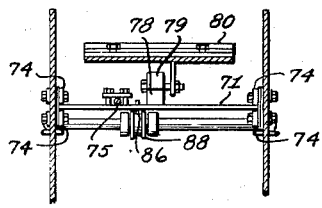
Fig. 15 is a sectional detail taken substantially on the line 15—15 in Fig. 14.

The shutter plate 71 is disposed between guide rollers 74 for withdrawal to feed the bobbins B into the chute structure 69 in this manner by actuating cable 75 that extends from the shutter 71 over pulleys 76 and 77 to a connection with follower arm portion 60 of the plunger actuating segment arm 58 (as seen in Figs. 15 and 16). This connection results in withdrawing the shutter plate 71 during each forward stroke of the plungers 57, so that the bobbins B thereon are allowed to drop into the chute structure 69 in position to fall between the pairs of stripping jaws 29 as soon as they are opened fully following a previous stripping operation.

As the shutter plate 71 is withdrawn for feeding a group of bobbins B to the jaws 29, a wedge cam 78 thereon is also withdrawn from beneath a follower roll 79 carried by a gate member 80 that is pivoted above the shutter plate 71 at 81 and is biased by a spring at 82 to move downwardly upon withdrawal of the wedge cam 78 so as to separate the selected group of bobbins B from the supply on the inclined feed pan 70 and prevent feeding of further bobbins B from the feed pan 70 until the shutter plate 71 has returned to its original position. The return of the shutter plate 71 is accomplished through a tension spring 83 extended from an anchor bracket 84 on the frame structure 10, around a pulley 85, to a flexible belt or strap 86 which runs over pulleys 87 and 88 to a connection with the shutter plate 71 in opposition to the actuating cable 75 so as to return the shutter plate 71 as the actuating cable 75 is let off by the follower arm portion 60 during the rearward stroke of the plungers 57, a bumper 89 being provided to stop the shutter plate 71 at its returned position against the tension of spring 83. As soon as the shutter plate 71 returns to its original position, the wedge cam 78 moves beneath the follower roll 79 to raise the gate member 80 and allow feeding of a further group of bobbins B onto the shutter plate 71 from the feed pan 70 to commence a succeeding cycle of operation.

The mechanism for feeding the bobbins B to the pairs of stripping jaws 29 also desirably includes a front guard plate 90 both as a safety measure and as a means for maintaining the bobbins B properly positioned between the pairs of stripping jaws 29 despite any tendency that there may be for the bobbins B to bounce as they drop from the chute structure 69. This guard plate 90 is mounted at its upper edge for lateral sliding motion on a shaft 91 supported adjacent each end on studs 92 that are yieldably positioned by springs as at 93, so as to remain free for proper alignment in attaching the shaft 91 thereon. The guard plate 90 is arranged to pivot as well as slide on the shaft 91, and a handle 94 is provided on the front face of the guard plate 90 so that it may be raised whenever necessary for access to the chute structure 69 or the stripping jaws 29, although the guard plate 90 normally hangs downward from the shaft 91 under its own weight and is maintained vertical when hanging free by a positioning roller 95 arranged thereon to bear against a guide rail 95′.

The lower edge of the guard plate 90 is formed with spaced notches 90′ for alignment with the pairs of stripping jaws 29 to provide clearance for ejection of bobbins B therefrom during the stripping operation, and it is accordingly necessary to shift the guard plate 90 laterally on the shaft 91 to align the guard plate notches 90′ for this purpose when the pairs of stripping jaws 29 are closed. This lateral shifting of the guard plate 90 is accomplished through a lever arm 96 (see Fig. 2) fixed on a pivot shaft 97 and bearing at its extending end against a circular flange 98 arranged on the upper edge portion of the guard plate 90 that is mounted to slide on the shaft 91. A compression spring 99 is arranged over the adjacent end of the shaft 91 to bear against the guard plate 90 oppositely in relation to the direction in which the lever arm 96 bears on the circular flange 98. The bias of this compression spring 99 tends to shift the guard plate 90 to the right as seen in Fig. 2 so that the clearance notches 90′ are aligned with the pairs of stripping jaws 29, and the lever arm 96 is operated to shift the guard plate 90 against this bias in properly timed relation to the opening and closing of the jaws 29 by means of a lever arm 100 (see Fig. 16) fixed on the rock shaft 20 through which opening and closing movement of the stripping jaws 29 is actuated. As seen in Fig. 16, the lever arm 100 pivots upwardly as the rock shaft 20 is operated to close the stripping jaws 29, and this upward pivoting of the lever arm 100 lets off a strap connection 101 extending upwardly therefrom to a lever 102 (compare Figs. 2 and 14 with Fig. 16). This lever 102 is mounted freely on the pivot shaft 97 for the guard plate shifting lever arm 96 and rests on a pin 103 extending laterally from an adjacent arm fixed on the pivot shaft 97, so that as the strap connection 101 is let off during closing of the stripping jaws 29 the compression spring 99 is allowed to shift the guard plate 90 to the right and align the notches 90′ at the bottom edge thereof with the stripping jaws 29; while upon opening of the stripping jaws 29, the related downward pivoting of the lever arm 100 pulls the strap connection 101 against the bias of the compression spring 99 and results in pivoting the shifting lever 96 to the left as seen in Fig. 2 to move the guard plate 90 so that its intermediate bottom edge portions between the notches 90′ will shroud the stripping jaws 29 while open. Manifestly, this shifting of the guard plate 90 might be actuated alternatively from the motion of any other element of the operating mechanism for opening and closing the stripping jaws 29, such as by a shifting lever (not shown) comparable to the lever 96 mounted directly on one of the stripping jaws 29.

Figs. 17 and 18 show related face views of the operating cams 16 and 17 arranged to illustrate a cycle of operation for the bobbin stripping machine of the present invention. The directional arrows at the hubs of the cams 16 and 17 in Figs. 17 and 18 indicate their direction of rotation during operation of the machine as illustrated by the other figures of the drawings, and the outer legend circle arranged about each cam 16 and 17 in Figs. 17 and 18 also has directional arrows applied thereto to indicate the direction in which the respective cam surfaces act on the followers therefor.

Starting with the cams 16 and 17 at the respective angular positions indicated at $a$ and $a'$ in Figs. 17 and 18, the cam 16 will have just completed closing of the pairs of stripping jaws 29 at the position $a$, and the cam 17 at the position $a'$ will have the displacement plungers 57 rearwardly disposed ready for their forward bobbin ejection stroke. As rotation of cam 16 continues to the angular position $b$, a dwell period is provided during which the pairs of stripping jaws 29 are maintained closed, while rotation of the cam 17 to the angular position $b'$ actuates the forward plunger stroke during which the plungers 57 advance axially through the closed pairs of stripping jaws 29 to effect the bobbin stripping and ejecting operation previously described above.

From the angular position $b$ to angular position $c$, cam 16 operates to open the pairs of stripping jaws 29, and cam 17 concurrently operates to retract the plungers 57 from the jaws 29 and complete the rearward plunger stroke in rotating from angular position $b'$ to angular position $c'$. The cam 17 is formed for a quick return stroke from positions $b'$ to $c'$ so that the plungers 57 are fully retracted from the stripping jaws 29 before they open sufficiently to allow a new group of spent bobbins B to fall therein from the previously mentioned multiple chute structure 69. From the angular position $c$ to angular position $d$, the cam 16 provides a dwell period for the stripping jaws 29 in open position to allow adequate time for the fall of the new group of bobbins B into proper position between the jaws 29, and then actuates the closing of the jaws 29 as it completes a cycle in rotating from angular position $d$ to angular position $a$. Meanwhile, after reaching the angular position $c'$, the cam 17 provides a dwell period during which the plungers 57 are maintained at their rearwardly retracted disposition until the angular position $a'$ is reached again to repeat the above described cycle of operation.

The present invention has been described in detail above for purposes of illustration only and is not intended to be limited by this description or otherwise except as defined in the appended claims.

We claim:

1. In a bobbin stripping machine for removing waste yarn windings from a spent bobbin having a cylindrical barrel, the improvement which comprises stripping jaws shaped for gripping the entire extent of waste yarn windings on said spent bobbin, the gripping faces of said jaws being rigid and having an arcuate profile with small, smooth-faced, raised portions spaced over the entire extent of said gripping faces, the spacing of said raised portions being proportioned to provide selective gripping action by said raised portions but being limited to prevent sufficient freedom for bunching of said waste yarn windings between said raised portions.

2. In a bobbin stripping machine for removing waste yarn windings from a spent bobbin having a cylindrical barrel, stripping jaws having a length at least substantially coextensive with the barrel of said bobbin, the gripping faces of said jaws being rigid and having a uniform arcuate profile with transverse grooves formed therein at spaced intervals over the entire length thereof leaving narrow, smooth-faced, transverse ridges at said faces, the width of said grooves being proportioned to provide selective gripping action by said ridges but being limited sufficiently to prevent bunching of said waste yarn windings between said ridges.

3. In a bobbin stripping machine for removing waste yarn windings from a spent bobbin having a cylindrical barrel, a plurality of cooperating stripping jaws, each of said stripping jaws being at least substantially coextensive in length with said bobbin barrel, having a rigid gripping face that is arcuate in profile at a radius exceeding slightly the radius of said bobbin barrel to approximate the mean radius of waste yarn windings on said barrel, and having said gripping face transversely grooved at spaced intervals over the entire length thereof leaving a series of narrow, smooth-faced, transverse ridges therein, the aggregate arcuate profiles of said cooperating stripping jaws being less than a full circle.

4. In a bobbin stripping machine for removing waste yarn windings from a spent bobbin having a cylindrical barrel, a pair of stripping jaws, said jaws being rigid and having a length at least equal to the maximum possible extent of said waste yarn windings lengthwise of said bobbin barrel, and said jaws having opposed gripping faces that are arcuate in profile at a radius approximating the mean radius of waste yarn windings on said barrel and that have transverse grooves formed in said gripping faces at spaced intervals over the entire length thereof leaving a series of narrow transverse ridges at said gripping faces, said narrow transverse ridges being of sufficient width to present blunt, smooth-faced, edges at said gripping faces, and said transverse grooves having a relative width sufficient to provide for selective gripping action by said ridges.

5. In a bobbin stripping machine, the structure defined in claim 4 and further characterized in that said grooves are of the order of four times wider than the spacings therebetween at which said ridges are left.

6. A bobbin stripper for removing waste yarn windings from spent bobbins of the type having cylindrical barrels, said bobbin stripper comprising opposed stripping jaws that are rigid and that are formed in a length at least equal to the maximum originally disposed extent of yarn windings lengthwise of the barrel of said bobbins, the opposed faces of said stripping jaws being arcuate in profile at a radius exceeding slightly the radius of said barrel and being grooved transversely at spaced intervals over the entire length thereof leaving a series of blunt, smooth-faced, transverse ridges at said faces, means for cyclically opening and closing said stripping jaws to receive a spent bobbin therebetween and grip the entire extent of waste yarn windings on said bobbin, and means for pushing said bobbin out of said waste yarn windings while gripped by the opposed faces of said stripping jaws.

7. A bobbin stripper for removing waste yarn windings from spent bobbins of the type having cylindrical barrels, said bobbin stripper comprising a pair of rigid stripping jaws mounted in opposed relation, said stripping jaws being formed in a length at least equal to the maximum originally disposed extent of yarn windings lengthwise of the barrel of said bobbins and having opposed faces that are arcuate in profile at a radius approximating the mean radius of waste yarn windings on said barrel and that are characterized by a series of spaced, blunt, smooth-faced, transverse ridges throughout the length thereof for gripping said windings, means for cyclically opening and closing said stripping jaws, means for feeding a spent bobbin between said stripping jaws when open, means for limiting said stripping jaws in spaced relation with respect to the barrel of said bobbin when closed to grip the waste yarn windings thereon, and means for ejecting said bobbin axially from said jaws when closed.

8. A bobbin stripper for removing waste yarn windings from spent bobbins of the type having cylindrical barrels, said bobbin stripper comprising a pair of rigid stripping jaws formed in a length at least equal to the maximum possible extent of waste yarn windings lengthwise of the barrel of said bobbins and having opposed gripping faces that are arcuate in profile at a radius exceeding slightly the radius of said barrel and that are characterized by a series of smooth-faced, transverse ridges spaced throughout the length thereof, said pair of stripping jaws being carried on a common pivot axis for opening to receive a spent bobbin therebetween and closing to grip the waste yarn windings on said barrel, means for feeding a spent bobbin between said stripping jaws when open, means for maintaining said stripping jaws in spaced relation with respect to the barrel of said bobbin when closed, and means for ejecting said bobbin axially from said jaws while closed.

9. A bobbin stripper for removing waste yarn windings from spent bobbins of the type having cylindrical barrels, said bobbin stripper comprising a bank of stripping jaw pairs, each pair of stripping jaws being arranged for opening to receive a spent bobbin therebetween and closing to grip the waste yarn windings thereon, said stripping jaws being formed in a length at least equal to the maximum possible extent of waste yarn windings lengthwise of the barrel of said spent bobbins, means for cyclically opening and closing all of the stripping jaw pairs in said bank simultaneously, means for feeding spent bobbins between all of said stripping jaw pairs when open, and means for ejecting said bobbins axially from all of said stripping jaw pairs when closed.

10. A bobbin stripper for removing waste yarn windings from spent bobbins of the type having cylindrical barrels, said bobbin stripper comprising at least two pairs of stripping jaws arranged in a bank for opening and closing, means for cyclically opening and closing all of said pairs of stripping jaws simultaneously, said means operating through yieldable connections to each of said pairs of stripping jaws for closing the same, means for introducing spent bobbins simultaneously between each of said pairs of stripping jaws when opened, and means for simultaneously displacing said spent bobbins axially from each of said pairs of stripping jaws when closed.

11. The method of feeding spent bobbins of the type having cylindrical barrels to a bank of stripping jaws for removing waste yarn windings therefrom, which method comprises arranging a supply of said spent bobbins, selecting a group of spent bobbins in said supply containing the number of bobbins that can be handled at one time by said bank of stripping jaws, separating said group of spent bobbins from said supply, and directing the spent bobbins of said separated group simultaneously to the respective stripping jaws of said bank.

12. The method of feeding spent bobbins of the type having cylindrical barrels between pairs of stripping jaws arranged in a bank for opening and closing simultaneously, which method comprises arranging a supply of said spent bobbins adjacent said bank of stripping jaws, selecting a group of said spent bobbins in said supply corresponding in number with the number of pairs of stripping jaws in said bank and separating said group from said supply, and transferring said separated group of spent bobbins to the stripping jaw pairs of said bank while said jaw pairs are closed for simultaneous introduction of said spent bobbins respectively between said jaw pairs upon opening thereof.

References Cited in the file of this patent

UNITED STATES PATENTS

| | | |
|---|---|---|
| 1,048,324 | Leathers | Dec. 24, 1912 |
| 1,057,356 | Mullikin | Mar. 25, 1913 |
| 1,091,595 | Smith | Mar. 31, 1914 |
| 1,092,413 | Vaillancourt | Apr. 7, 1914 |
| 1,439,162 | Hannah | Dec. 19, 1922 |

FOREIGN PATENTS

| | | |
|---|---|---|
| 638,417 | Great Britain | Dec. 15, 1936 |